No. 825,646. PATENTED JULY 10, 1906.
M. B. GOOING.
LAND SMOOTHER.
APPLICATION FILED NOV. 10, 1905.
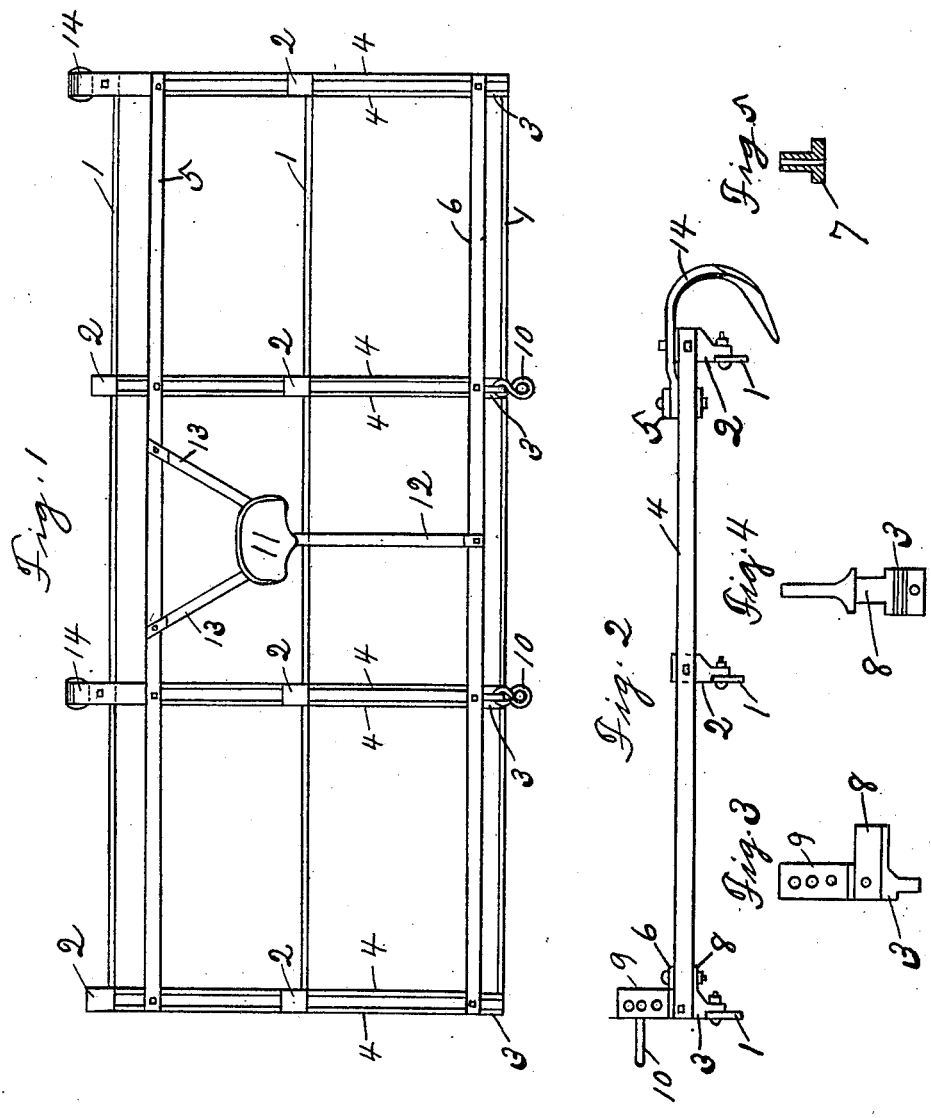
Witnesses:—
L. T. Knight
J. W. Stitt
Inventor,
M. B. Gooing,
By A. L. Jackson,
Attorney

UNITED STATES PATENT OFFICE.

MARTIN B. GOOING, OF DALLAS, TEXAS.

LAND-SMOOTHER.

No. 825,646.
Specification of Letters Patent.
Patented July 10, 1906.

Application filed November 10, 1905. Serial No. 286,694.

*To all whom it may concern:*

Be it known that I, MARTIN B. GOOING, a citizen of the United States, residing at Dallas, Texas, have invented a new and Improved Land-Smoother, of which the following is a specification.

This inventoin relates to an agricultural instrument, and more particularly to instruments for breaking and smoothing rough ground; and the object is to provide instruments which will break clods of dirt and smooth the surface of the land after it has been broken and which are simple and inexpensive and strong and durable.

Other objects and advantages will be fully explained in the following description, and the invention will be more particularly pointed out in the claims.

Reference is had to the accompanying drawings, which form a part of this application and specification.

Figure 1 is a plan view of the land-smoother. Fig. 2 is a side elevation of the same. Fig. 3 is a side elevation of one of the front posts or blade-carriers. Fig. 4 is a rear elevation of the same. Fig. 5 is a sectional view of one of the inverted-T blocks, to which is attached the rear brace.

Similar characters of reference are used to indicate the same parts throughout the several views.

This invention comprises a plurality of blades carried by suitable posts, which are provided with suitable braces. For the purpose of illustrating my invention I show a device provided with three blades or bars 1, which are bolted to posts 2 and 3, the posts 3 being the series of posts for the front blade. The posts 2 and 3 are braced from front to rear by pairs of braces 4, which are countersunk in posts 2 and 3 and bolted thereto. The grooves in the posts are just large enough to receive the braces 4, so that the walls of the grooves will rest against the braces 4, and thus aid in making the braces and the posts rigid with each other. The braces 4 and the posts 2 and 3 are further braced by the cross-bars 5 and 6. The bar 5 is bolted to inverted-T blocks 7, which are placed with the body portions between the braces 4. The front posts 3 are different from posts 2 in that posts 3 have rear extensions 8, to which the bar 6 is bolted and these posts have upward extensions 9, to which draft appliances may be attached. The bars 5 and 6 and the blades 1 brace the implement sidewise, and the braces 4 brace the implement from front to rear. The upward extensions of posts 3 are provided with holes in which hooks 10 may be inserted for attaching draft appliances. The draft appliances must be attached higher than the body of the implement, so that the front part of the implement will not be raised from the ground while the device is being driven. The rear extensions 8 add considerably to the rigidity of the device, because the flanges below the braces 4 press against the braces 4 when the bar 6 is clamped against the upper sides of the braces by bolts A seat 11 may be attached to the device in any suitable manner, as by legs 12 and 13, bolted, respectively, to bar 6 and bar 5 Whenever it may be desirable, plows 14 may be attached to the rear part of the implement for opening drills for planting seed or for other purposes. Fig. 1 shows two such plows attached to the rear part of the device, and Fig. 2 illustrates more clearly the manner of attaching the plows to the implement. The end of the shank is placed under the bar 5 and bolted there with the same bolts which secure this bar to the implement. The shanks may be further bolted to the rear posts 2.

It is apparent that various changes may be made in constructing this implement without departing from my invention. The number of posts and front-to-rear braces may be increased, and the number of smoothing blades or bars may be increased.

Having fully described my invention, what I claim as new and desire to secure by Letters Patent, is—

1. A land-smoother having a plurality of smoothing-blades, a plurality of posts carrying said blades, a plurality of front-to-rear braces attached to said posts, the contacting parts of said braces being countersunk in said posts, and bars for bracing said braces.

2. A land-smoother having a plurality of blades, a plurality of posts or studs carrying said blades, a series of pairs of braces for said posts, the contacting parts of said braces being countersunk in said posts or studs, front and rear bars for bracing said braces, and blocks between each of said pairs of braces for attaching said bars to said braces.

3. A land-smoother having a plurality of blades, a series of posts for each blade, a series of pairs of braces connected to said posts from front to rear, the front posts each having a rear extension between each pair of braces, a front cross-bar attached to said rear extensions, and a rear cross-bar attached to said braces.

4. A land-smoother having a plurality of blades, a series of posts carrying each blade, a series of pairs of braces connecting said posts from front to rear, a rear cross-bar, an inverted-T block placed between each pair of braces for attaching said bar to said braces, and plows attached to the rear of said land-smoother.

5. A land-smoother having a plurality of blades, a series of posts carrying each blade, a series of pairs of braces connecting said posts from front to rear, a rear cross-bar attached to said braces, a front cross-bar, the series of front posts each having a rear extension and said front cross-bar being attached to said rear extensions, and said front posts having upward extensions for attaching draft appliances.

In testimony whereof I set my hand, in the presence of two witnesses, this 6th day of November, 1905.

MARTIN B. GOOING.

Witnesses:
A. L. JACKSON,
J. W. STITT.